United States Patent [19]
Yoshizaki

[11] Patent Number: 5,800,789
[45] Date of Patent: Sep. 1, 1998

[54] ELECTRICALLY HEATED CATALYST ACHIEVING SMALLER POWER CONSUMPTION

[75] Inventor: Kouji Yoshizaki, Numazu, Japan

[73] Assignee: Toyota Jidosha Kabushiki Kaisha, Aichi, Japan

[21] Appl. No.: 633,918

[22] Filed: Apr. 15, 1996

[30] Foreign Application Priority Data

Apr. 18, 1995 [JP] Japan ................... 7-092506

[51] Int. Cl.⁶ ................................. F01N 3/10
[52] U.S. Cl. ................ 422/174; 422/180; 422/199; 422/222; 60/300; 219/541; 219/552; 392/485; 55/DIG. 30
[58] Field of Search ................... 422/171, 177, 422/174, 180, 199, 211, 222; 60/299, 300; 219/553, 541, 552; 392/386, 488, 485; 55/DIG. 30; 428/116, 593, 594

[56] References Cited

U.S. PATENT DOCUMENTS

| | | | |
|---|---|---|---|
| 4,976,929 | 12/1990 | Cornelison et al. | 422/174 |
| 5,094,074 | 3/1992 | Nishizawa et al. | 422/174 |
| 5,229,080 | 7/1993 | Abe et al. | 422/174 |

FOREIGN PATENT DOCUMENTS

| | | |
|---|---|---|
| A-0560290 | 9/1993 | European Pat. Off. |
| B-1138380 | 10/1962 | Germany |
| 2-277916A | 11/1990 | Japan |
| 5-248231A | 9/1993 | Japan |
| 5-248234A | 9/1993 | Japan |
| 5-296032A | 11/1993 | Japan |
| WO-A-9213636 | 8/1992 | WIPO |

OTHER PUBLICATIONS

SAE Technical Paper Series 940465 "Ultra–Low Power Electrically–Heated Catalyst System", Feb. 28–Mar. 3, 1994.

*Primary Examiner*—Hien Tran
*Attorney, Agent, or Firm*—Kenyon & Kenyon

[57] ABSTRACT

An electrically heated catalyst installed in an exhaust pipe of an internal combustion engine, featuring simple construction, without causing the flow resistance of the exhaust gases to increase, and consuming small amounts of electric power. The electrically heated catalyst has two electrodes of different polarities in a casing through which the exhaust gases flow and has at least one catalyst support that is folded plural times in a zig-zag manner in a direction intersecting the direction of flow of the exhaust gases without coming into contact with itself, the two ends of the catalyst support being connected to these two electrodes. The catalyst support is constituted by a flat foil and a corrugated foil that are joined together, and electric insulators are provided at the folding portions of the catalyst support to stretch and support the catalyst support inside the casing. Owing to the insulators, the catalyst support is held in the casing in a state of receiving tension. By using the thus constituted electrically heated catalyst, the regular catalytic converter on the downstream side of the electrically heated catalyst is heated while consuming small amounts of electric power and maintaining a small flow resistance to the exhaust gases.

17 Claims, 16 Drawing Sheets

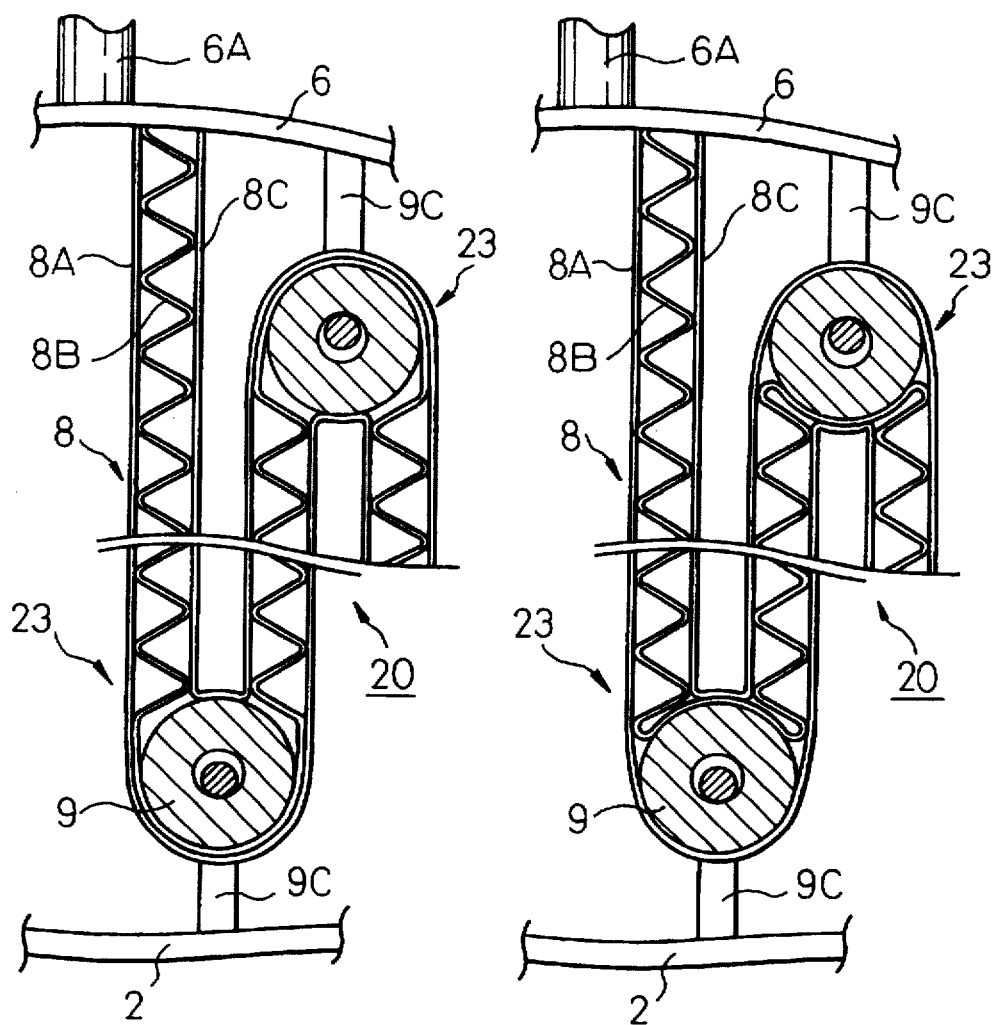

ELECTRICALLY HEATED CATALYST ACHIEVING SMALLER POWER CONSUMPTION

BACKGROUND OF THE INVENTION

1. Field of the Invention

The present invention relates to an electrically heated catalyst and, particularly, to an electrically heated catalyst which, when it is cold as when cold-starting an internal combustion engine, is electrically heated to promote the activation of the catalyst yet consumes a small amount of electric power.

2. Description of the Related Art

The exhaust gases emitted from an internal combustion engine mounted on a vehicle contain harmful substances such as HC (hydrocarbons), CO (carbon monoxide), NOx (nitrogen oxides), etc. Generally, therefore, the exhaust system of the internal combustion engine is provided with a catalytic converter which is a device for cleaning exhaust gases that contain such harmful substances. However, it has been known that the three-way catalyst used for the catalytic converter hardly removes harmful substances contained in the exhaust gases when the temperature of the catalyst is low (in an inactive stage). Immediately after the internal combustion engine is cold-started, therefore, the catalytic converter remains in an inactive state, and the exhaust gases are not cleaned to a sufficient degree.

In an attempt to solve this problem, therefore, an exhaust gas purifying device has been proposed according to which the exhaust system is provided with a second electrically heated catalytic converter (EHC: electrically heated catalyst) having an electric heater and supporting an oxidizing catalyst or a three-way catalyst on the upstream side of the catalytic converter. When the catalytic converter is in an inactive state, the second catalytic converter is electrically heated to forcibly activate the oxidizing catalyst or the three-way catalyst, in order to remove harmful components such as HC (hydrocarbons), etc.

Japanese Unexamined Patent Publication (Kokai) No. 5-48231 discloses an electrically heated catalyst contained in a floor tunnel that is formed in the central portion of the floor panel which constitutes part of the chassis. This electrically heated catalyst has an insulated holding layer (support) in a casing, and a catalyst unit group consisting of many catalyst units is contained in the support being arranged maintaining a predetermined gap in the direction of the width of the chassis. The support works to maintain insulation from the periphery thereof and to impart strength to the catalyst units. Each catalyst unit is folded at a folding portion, and a sheet-like spacer is provided between the neighboring catalyst units. Each catalyst unit is formed by alternatingly laminating plural pieces of flat plates and corrugated plates of a heat-resistant iron-chromium-aluminum alloy having a thickness of 40 to 50 μm. Furthermore, an oxidizing catalyst such as platinum or palladium is supported on the surfaces of the flat plates and corrugated plates to remove unburned components such as harmful hydrocarbons in the exhaust gases.

With the electrically heated catalyst disclosed in Japanese Unexamined Patent Publication (Kokai) No. 5-48231, however, when it is attempted to decrease the ratio of occupation of the catalyst support relative to the exhaust pipe in order to decrease the heat mass of the catalyst unit into which the electric current flows, it becomes necessary to increase the thickness of the spacer to maintain the strength of the foil layer. However, a problem remains in that the flow resistance of the exhaust gases through the exhaust pipe increases with an increase in the thickness of the spacer.

SUMMARY OF THE INVENTION

The object of the present invention therefore is to provide an electrically heated catalyst which is simply constructed, does not cause the flow resistance of the exhaust gases to increase and consumes small amounts of electric power.

According to a first aspect of the present invention, there is provided an electrically heated catalyst comprising an outer casing for passing the exhaust gases, two electrodes having different polarities provided inside the outer casing, at least one catalyst support formed of metal foils which are accommodated in the outer casing being folded at least twice in a zig-zag manner in a direction to intersect the direction of flow of the exhaust gases without coming into contact with each other, both ends of the metal foils being connected to the two electrodes, and folding axis members for stretching and supporting the catalyst support inside the outer casing.

According to a second aspect of the present invention, there is provided an electrically heated catalyst of the first aspect wherein, among a plurality of folding portions of the catalyst support, one electrode is disposed at a folding portion of an odd number as counted from the other electrode to which is connected one end of the catalyst support, the other electrode is disposed at a folding portion of an even number, and the folding axis members support the catalyst support maintaining electric insulation from the two electrodes.

According to a third aspect of the present invention, there is provided an electrically heated catalyst of the first or second aspect, wherein the catalyst support is constituted by joining a flat foil and a corrugated foil together, and contact portions of the corrugated foil and the flat foil are supported at the folding portions.

According to a fourth aspect of the present invention, there is provided an electrically heated catalyst of the second aspect, wherein the catalyst supports constituted by being folded at least twice are disposed in a plural number inside the outer casing, and the catalyst supports are connected at both of their ends to two electrodes, respectively.

According to a fifth aspect of the present invention, there is provided an electrically heated catalyst of the fourth aspect, wherein a plurality of catalyst supports are disposed inside the outer casing in such a manner that the folding portions of the neighboring catalyst supports are folded in opposite directions. According to a sixth aspect of the present invention, there is provided an electrically heated catalyst of the fourth or fifth aspect, wherein the direction for stretching the catalyst support inside the outer casing is in agreement with the direction of principal vibration of the catalyst support.

According to a seventh aspect of the present invention, there is provided an electrically heated catalyst of the fourth aspect, wherein the catalyst supports have widths that vary depending upon the positions where they are stretched in the direction along the flow of the exhaust gases, and have end positions that are trued up on the downstream side of the flow of the exhaust gases.

According to an eighth aspect of the present invention, there is provided an electrically heated catalyst comprising an outer casing for passing the exhaust gases, an electrode provided inside the outer casing, a catalyst support formed of metal foils which are accommodated in the outer casing being folded at least twice in a zig-zag manner in a direction to intersect the direction of flow of the exhaust gases without coming into contact with each other, both ends of the metal foils being connected to the electrodes, insulating folding axis members made of an insulating material provided at the folding portions of the catalyst support to stretch and support the catalyst support inside the outer casing, electrically conducting folding members that are provided at the folding portions maintaining an interval of a few other folding portions of the catalyst support to stretch and support the catalyst support inside the outer casing and to connect the catalyst support to the electrode, and electrically conducting members that are electrically connected to the catalyst support at intermediate positions between one end of the catalyst support and the electrically conducting folding member and at intermediate positions between the neighboring electrically conducting folding members in order to connect the catalyst support at the connected portions to another electrode having a potential different from said electrode.

According to the electrically heated catalyst of the first aspect of the present invention, the folding axis members are secured to the outer side of the catalyst support at the folding portions and do not cause the flow resistance of the exhaust gases to increase. According to the electrically heated catalyst of the second aspect of the present invention, the folding axis members are secured to the electrodes. Therefore, the electrodes also serve as supports for supporting the catalyst support, enabling the structure to be simplified. According to the electrically heated catalyst of the third aspect of the present invention, the folding axis members are disposed at the contacting portions of the corrugated foil and the flat foil that constitute the catalyst support. Therefore, the contacting portions are reinforced. According to the electrically heated catalyst of the fourth aspect of the present invention, a plurality of catalyst supports make it easy to adjust the amount of heat generated by the heated portions. According to the electrically heated catalyst of the fifth aspect of the present invention, even when the catalyst supports come into contact with each other due to vibration or loosened mounting of the catalyst supports, the catalyst supports are little damaged since the potential difference is small. According to the electrically heated catalyst of the sixth aspect of the present invention, the direction in which the catalyst supports stretch is in agreement with the direction of principal vibration. Therefore, the stretched catalyst supports are hardly likely to come into contact with each other despite vibration. According to the electrically heated catalyst of the seventh aspect of the present invention, the catalyst supports having widths that vary in a direction along the flow of the exhaust gases have end surfaces that are trued up on the downstream side of the exhaust gases. This makes it possible to minimize the distance relative to the regular catalyst disposed on the downstream side. According to the electrically heated catalyst of the eighth aspect of the present invention, it is allowed to constitute the electrically heated catalyst provided with a plurality of current paths using a single catalyst support. It is further allowed to adjust the amount of heat generated at each of the portions of the catalyst support by simply changing the position of the catalyst support that is connected to the second electrode.

BRIEF DESCRIPTION OF THE DRAWINGS

The present invention will be more clearly understood from the description as set forth below with reference to the accompanying drawings, wherein:

FIG. 6A is a diagram illustrating, on an enlarged scale, a third example of the folding portion of the catalyst support using the insulator in the electrically heated catalyst in which the catalyst support is formed by interposing a corrugated foil between two pieces of flat foils according to the second embodiment of the present invention;

FIG. 6B is a diagram illustrating, on an enlarged scale, a fourth example of the folding portion of the catalyst support using the insulator in the electrically heated catalyst in which the catalyst support is formed by interposing a corrugated foil between two pieces of flat foils according to the second embodiment of the present invention;

DESCRIPTION OF THE PREFERRED EMBODIMENTS

Before describing the preferred embodiments, an explanation will be given of the conventional electrically heated catalyst shown in FIGS. 1A and 1B.

Figure 1A:
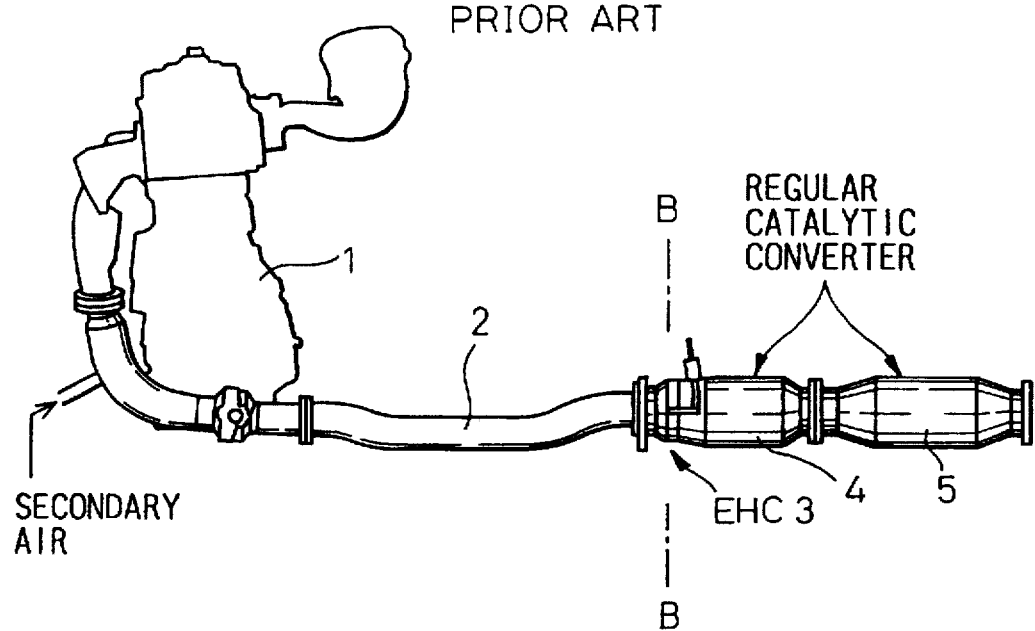
FIG. 1A is a diagram illustrating a position where a conventional electrically heated catalyst is installed in the exhaust pipe of an internal combustion engine.
Figure 1B:
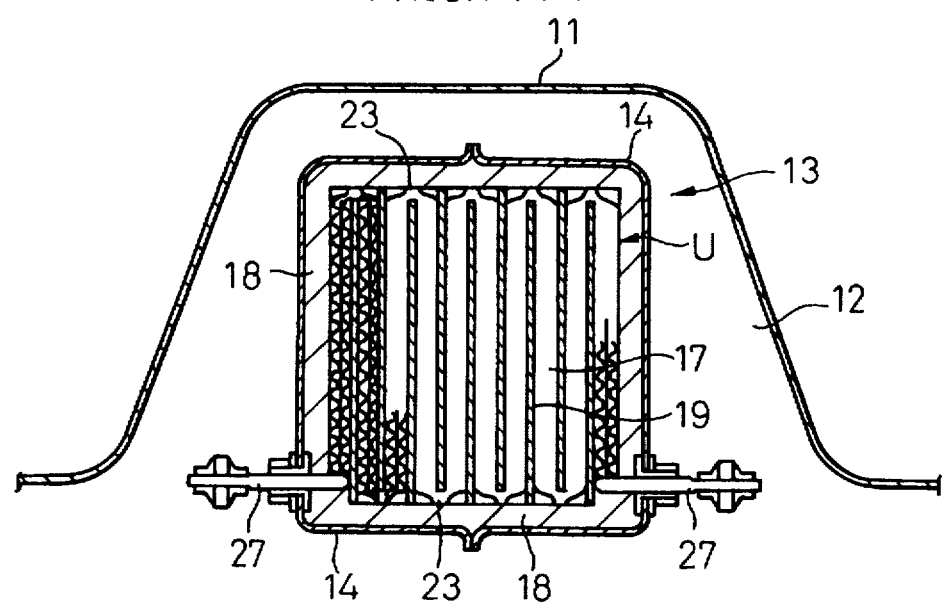
FIG. 1B illustrates the structure of the conventional electrically heated catalyst and is a schematic sectional view along the line B—B of FIG. 1A in a direction perpendicular to the flow of the exhaust gases through the exhaust pipe.

FIG. 1A is a diagram illustrating a position where the electrically heated catalyst 3 is generally installed in the exhaust pipe 2 of an internal combustion engine 1. As will be understood from this diagram, the electrically heated catalyst 3 is provided on the upstream side of the regular catalytic converters 4 and 5. FIG. 1B is a schematic sectional view of the electrically heated catalyst 3 along the line B—B of FIG. 1A in a direction perpendicular to the flow of the exhaust gases through the exhaust pipe 2, and illustrates the structure of an electrically heated catalyst disclosed in Japanese Unexamined Patent Publication (Kokai) No. 5-248231.

The electrically heated catalyst 13 contained in a floor tunnel 12, formed at the central portion of the floor panel 11 constituting a portion of the chassis, is provided with an insulating support layer (support) 18 in a casing 14 thereof. The support 18 contains a catalyst unit group U consisting of many catalyst units 17 that are arranged maintaining a predetermined gap in the direction of width of the chassis. The support 18 works to maintain insulation from the periphery and to maintain the strength of the catalyst units 17. Each catalyst unit 17 is folded at a folding portion 23, and a sheet-like spacer 19 is provided between the neighboring catalyst units 17. Each catalyst unit is formed by alternatingly laminating plural pieces of flat plates and corrugated plates of a heat-resistant iron-chromium-aluminum alloy having a thickness of 40 to 50 μm. Furthermore, an oxidizing catalyst such as platinum or palladium is supported on the surfaces of the flat plates and corrugated plates to remove unburned components such as harmful hydrocarbons in the exhaust gases. In the drawing, reference numeral 27 denotes electrodes for passing an electric current to the catalyst units 17.

With the electrically heated catalyst disclosed in Japanese Unexamined Patent Publication (Kokai) No. 5-248231, however, when it is attempted to decrease the ratio of occupation of the catalyst support relative to the exhaust pipe in order to decrease the heat mass of the catalyst unit into which the electric current flows, it becomes necessary to increase the thickness of the spacer to maintain the strength of the foil layer. However, a problem remains in that the flow resistance of the exhaust gases through the exhaust pipe increases with an increase in the thickness of the spacer.

Figure 2A:
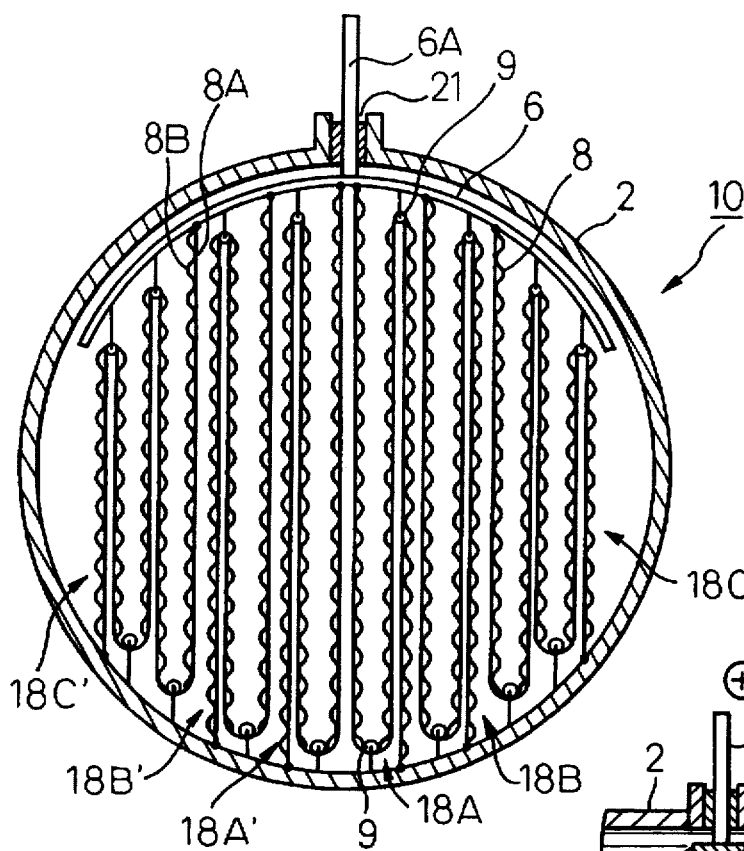
FIG. 2A is a sectional view of an electrically heated catalyst according to a first embodiment of the present invention in a direction perpendicular to the flow of the exhaust gases at a portion of line B—B in the exhaust pipe of the internal combustion engine shown in FIG. 1A.
Figure 2B:
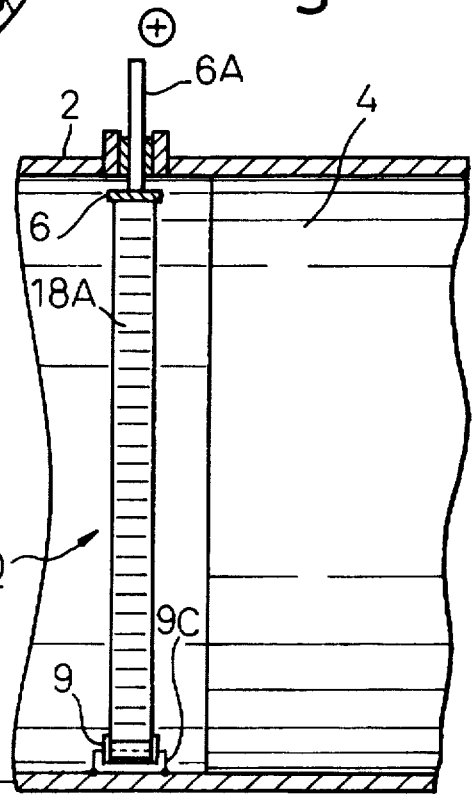
FIG. 2B is a sectional view of the electrically heated catalyst of FIG. 2A installed in the exhaust pipe in a direction in parallel with the flow of the exhaust gases in the exhaust pipe.
Figure 2C:
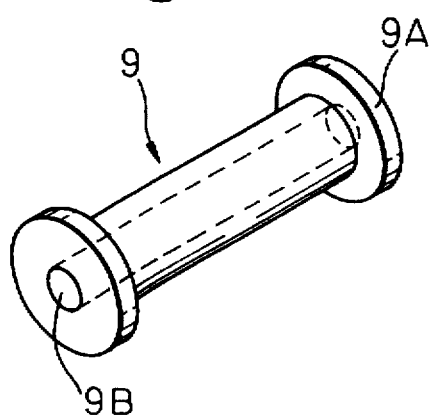
FIG. 2C is a perspective view illustrating the constitution of an insulator used at a folding portion of the catalyst support shown in FIG. 2B.

FIGS. 2A to 2C illustrate the structure of an electrically heated catalyst 10 according to a first embodiment of the present invention which is provided in the exhaust pipe 2 on the upstream side of the regular catalytic converter 4 as in the conventional electrically heated catalyst 13 explained with reference to FIG. 1A. As explained with reference to FIG. 1B, furthermore, the electrically heated catalyst 10 according to the first embodiment of the present invention is provided at the same position as the electrically heated catalyst 13 that is contained in the floor tunnel 12 formed at the central portion of the floor panel 11 constituting a portion of the chassis.

In the first embodiment as shown in FIG. 2A, a first arcuate electrode 6 having, for example, positive polarity is provided on the inside of a grounded outer casing (exhaust pipe) 2 along the inner peripheral surface of the outer casing 2. The electrode 6 is drawn to the outer side of the outer casing 2 through a terminal 6A which penetrates through a hole 21 perforated in the outer casing 2. In this embodiment, the outer casing 2 works as a second electrode (having, for example, negative polarity).

In the first embodiment, a belt-like metal foil obtained by joining a flat foil 8A and a corrugated foil 8B together is used as a catalyst support 8. The catalyst support 8 has a predetermined length and is stretched inside the outer casing 2 being folded in a zig-zag manner an even number of times (two or four times in this embodiment) in a direction to intersect the direction of flow of the exhaust gases without contacting itself. That is, the support 8 is coupled at a first end to the electrode 6 and extends toward the opposite side of the casing 2 (downward as shown in FIG. 2A) to a lowermost point at which it is folded about an insulator 9 and directed back toward the electrode 6. Each support 8 includes an even number of folds so that a first end is coupled to the electrode 6 and a second end extends to the casing 2. An end of the catalyst support 8 (denoted as catalyst support 18A) positioned at the central portion of the outer casing 2 is connected near the terminal 6A of the first electrode 6, is permitted to hang down toward the inner wall of the opposing outer casing 2, and is then folded via an insulator 9 which is a folding axis member mounted on the inner wall of the outer casing 2. The catalyst support 18A is further folded via the insulator 9 mounted on the first electrode 6, permitted to hang down again on the inner wall of the outer casing 2 and is connected to the inner wall of the outer casing 2.

As described above, the second electrode (outer casing 2) is adjacent to an odd numbered folding portion as counted from the first electrode 6 to which an end of the catalyst support 18A is connected among a plurality of folding portions, and the first electrode 6 is adjacent to even numbered folding portions. The insulator 9 supports the catalyst support 18A maintaining insulation between the first electrode 6 and the outer casing 2 which is the second electrode.

In the first embodiment as described above, another catalyst support 18B that is folded two times is provided on the right side of the catalyst support 18A that is folded two times. Similarly, a catalyst support 18C folded four times is provided adjacent to the catalyst support 18B. On the left side of the outer casing 2 catalyst supports 18A', 18B' and 18C' are provided in a symmetrical manner to the catalyst supports 18A, 18B and 18C provided on the right half side of the outer casing 2.

In the first embodiment, furthermore, the catalyst supports 8 are stretched in the exhaust pipe 2 in a direction parallel to the direction in which gravitational acceleration is exerted. Therefore, the catalyst supports 8 hardly come into contact with neighboring supports even when they are stretched and loosened.

FIG. 2B illustrates a state where the electrically heated catalyst 10 of FIG. 2A is installed in the exhaust pipe 2, and is a vertical sectional view at the portion of the catalyst support 18A. In the electrically heated catalyst 10 of the first embodiment, the power source of positive polarity is connected to, for example, the terminal 6A and the outer casing 2 is grounded. Referring to FIG. 2C, the insulator 9 has the shape of a bobbin with a flange 9A at both ends thereof, and has a through hole 9B. As shown in FIG. 2B, the insulator 9 is attached to the outer casing 2 by a mounting member 9C inserted in the through hole 9B.

Figure 3A:
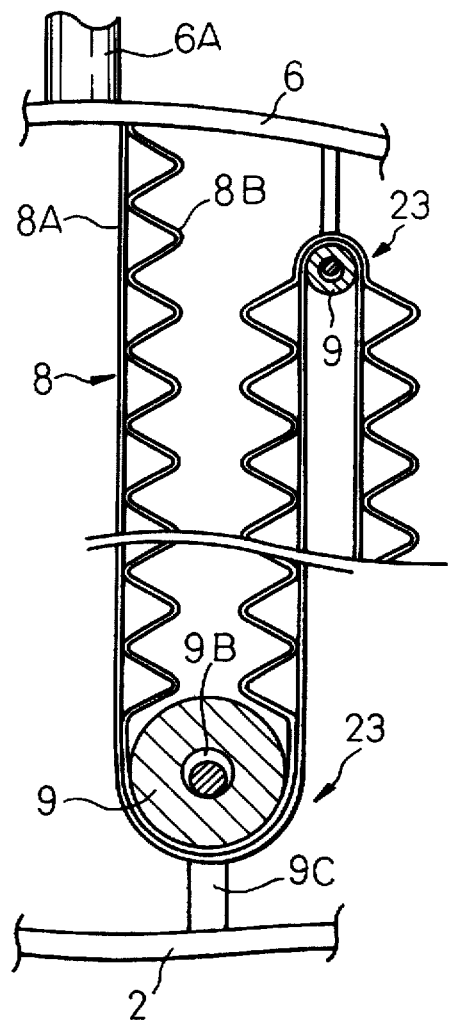
FIG. 3A is a diagram of a portion of FIG. 1A on an enlarged scale, and illustrates the structure of a folding portion of the catalyst support made up of a flat foil and a corrugated foil by using an insulator according to the first embodiment.
Figure 3B:
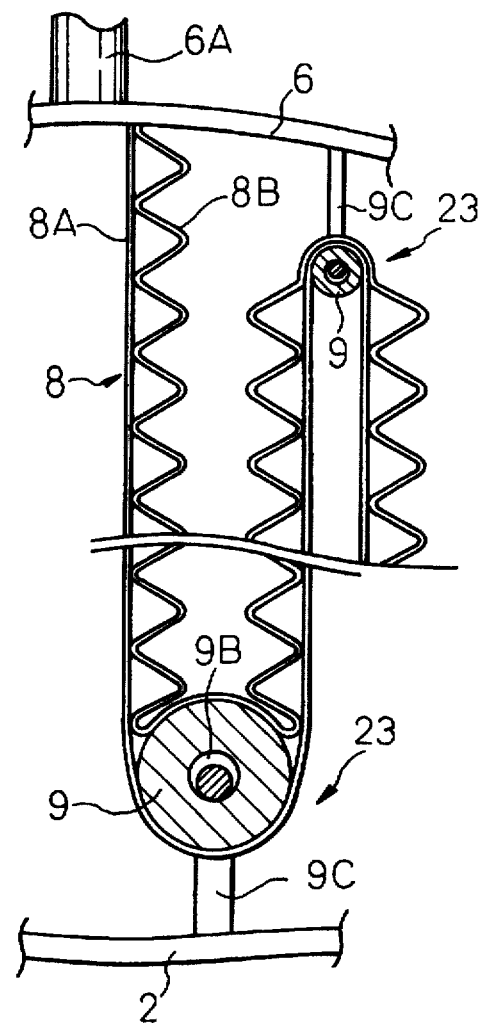
FIG. 3B is a diagram of a portion of FIG. 1A on an enlarged scale, and illustrates another structure of a folding portion of the catalyst support made up of a flat foil and a corrugated foil by using an insulator according to the first embodiment.

FIGS. 3A and 3B are diagrams illustrating, on an enlarged scale, a major portion of FIG. 2A to explain an example of the structure of the folding portion 23 using the insulator 9 at which the belt-like catalyst support 8 formed by the flat metal foil 8A and the corrugated metal foil 8B is folded according to the first embodiment. When the catalyst support 8 is folded with the corrugated foil 8B on the inside, the corrugated foil 8B is crushed by the insulator 9 at the folding portion 23 of the catalyst support 8 as shown at the lower portion of FIG. 3A. As shown at the lower portion of FIG. 3B, furthermore, the junction portion of the corrugated foil 8B and the flat foil 8A may be peeled off to form a space, and the insulator 9 may be inserted therein to be mounted. When the catalyst support 8 is to be folded with the flat foil 8A on the inside, the insulator 9 may simply stay in place as shown at the upper portion of FIG. 3A and at the upper portion of FIG. 3B.

When the catalyst support 8 is to be folded with the corrugated foil 8B on the inside, the insulator 9 used at the folding portion 23 must have an increased diameter so that the corrugated foils 8B will not come into contact with one another after the catalyst support 8 is folded. When the catalyst support 8 is folded with the flat foil 8A on the inside, the insulator 9 used at the folding portion 23 may have a small diameter since the flat foils 8A are opposed to each other after the catalyst support 8 is folded.

When the catalyst support 8 of the electrically heated catalyst 10 is formed by using the flat foil 8A and the corrugated foil 8B, it is recommended that the catalyst support 8 has a small width in the direction in which the exhaust gases flow so as to exhibit an increased electric resistance and the length of the catalyst support 8 is so adjusted as to match the amount of electric power supplied from the storage battery, so that the temperature of the catalyst support 8 quickly rises when an electric current is supplied to the catalyst support 8.

The first embodiment constituted as described above offers the following advantages.

(1) Though the catalyst support 8 having a small width in the direction in which the exhaust gases flow is weak against the pushing force, the flat foil 8A that is stretched between the first electrode 6 and the outer casing 2 under the application of tension makes it possible to increase durability in the structure.

(2) There is no need to subject the catalyst support 8 to the oxidation treatment in advance.

(3) Without carrying out the oxidation treatment, the catalyst support 8 can be obtained by joining the foils by brazing just like regular catalysts.

(4) A desired electric resistance can be obtained by selecting the thickness, width and overall length of the foils that form the catalyst support 8.

(5) By increasing the gap between the flat foil 8A and the corrugated foil 8B of the neighboring catalyst supports 8, it is possible to increase the number of the apparent cells while keeping the number of the cells of the corrugated foil 8B small, to decrease the heat mass, to heat the catalyst supports 8 over wide areas, and to activate the catalyst over a wide area with a heater installed in the exhaust pipe.

(6) There exists no electrode having a large heat mass at a central portion in the outer casing 2 where the exhaust gases flow most efficiently, and the flow of exhaust gases is not hindered. Therefore, this structure is advantageous against thermal distortion.

Figure 4:
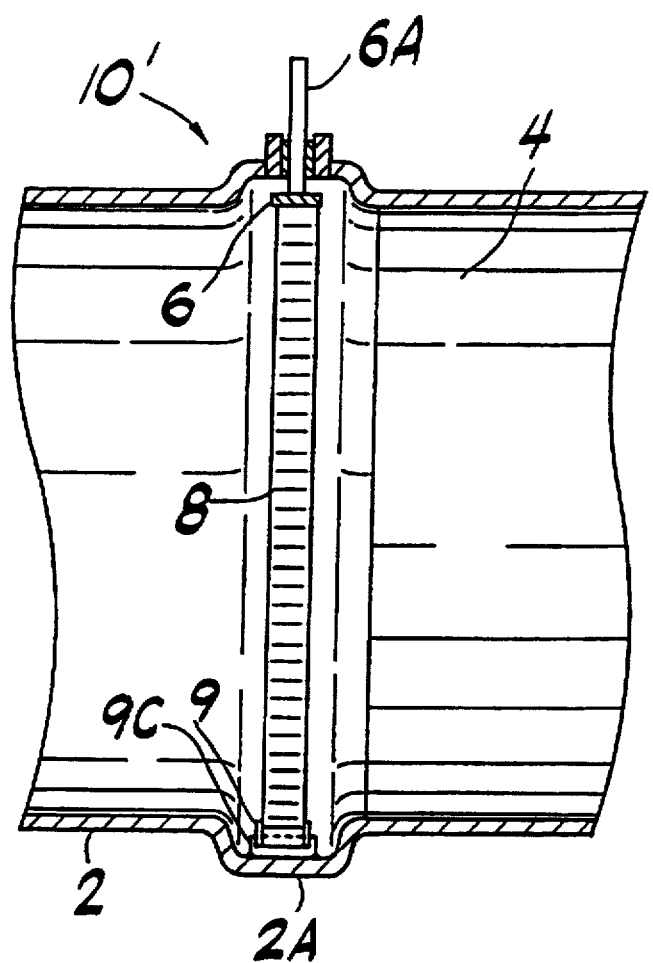
FIG. 4 illustrates the structure of the electrically heated catalyst of a modified example according to the first embodiment of the present invention, and is a sectional view illustrating the state where the electrically heated catalyst shown in FIG. 1A is installed in the exhaust pipe in a direction parallel with the flow of the exhaust gases through the exhaust pipe.

FIG. 4 illustrates the structure of the electrically heated catalyst 10' according to a modified example of the first embodiment. In this modified example, a large-diameter portion 2A is formed by increasing the diameter of the tube at a portion where the electrically heated catalyst 10' is grounded in the exhaust pipe 2, and the first electrode 6 and the insulator 9 are inserted in the large-diameter portion 2A. This constitution offers the following advantages.

(1) The exhaust gas does not come into direct contact with the first electrode 6 or the insulator 9 and, hence, thermal distortion decreases, which is advantageous for raising the temperature of the catalyst support 8.

(2) The portions having a large heat mass and where the temperature rises slowly are inserted in the large-diameter portion 2A. Therefore, the exhaust gases near the inner walls in the exhaust pipe 2 can be purified quickly.

FIGS. 5A, 5B, 6A, 6B and 7 illustrate the structure of an electrically heated catalyst 20 according to a second embodiment of the present invention in which a corrugated foil 8B is sandwiched between two pieces of flat foils 8A and 8C to form the catalyst support 8, and show the same portions as those of FIGS. 2A and 2B. When the catalyst support 8 is formed by interposing the corrugated foil 8B between the two pieces of flat foils 8A and 8C as shown in FIGS. 5A, 5B, 6A, 6B and 7, there is no directivity of front surface or back surface in folding the catalyst support 8.

The catalyst support 8 can be folded by a variety of methods depending upon the diameter of the insulator 9 used at the folding portion 23. The position of the folding portion 23 of the catalyst support 8 is known in advance. Therefore, various folding methods can be employed by adjusting the pitch of the corrugated foil 8B, or by adjusting the length of the flat foils 8A and 8C.

Figure 5A:
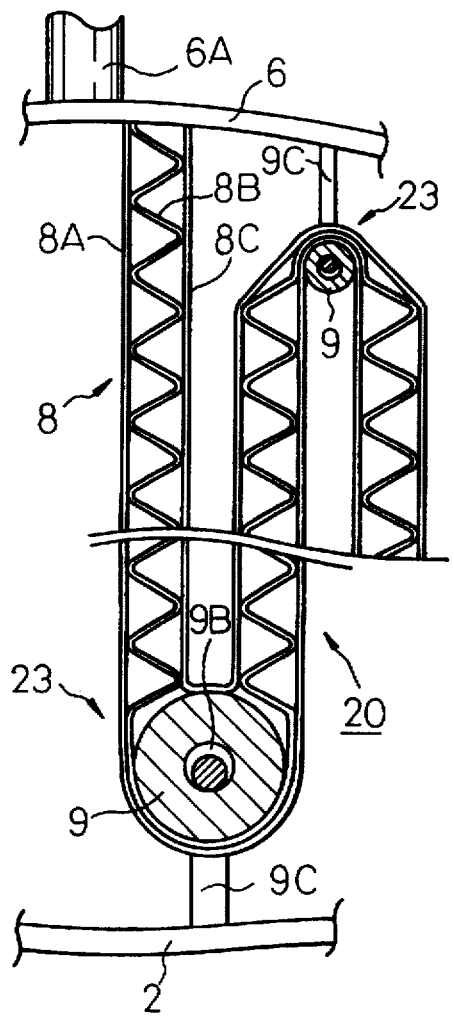
FIG. 5A is a diagram illustrating, on an enlarged scale, a first example of the folding portion of the catalyst support using the insulator in the electrically heated catalyst in which the catalyst support is formed by interposing a corrugated foil between two pieces of flat foils according to a second embodiment of the present invention.
Figure 5B:
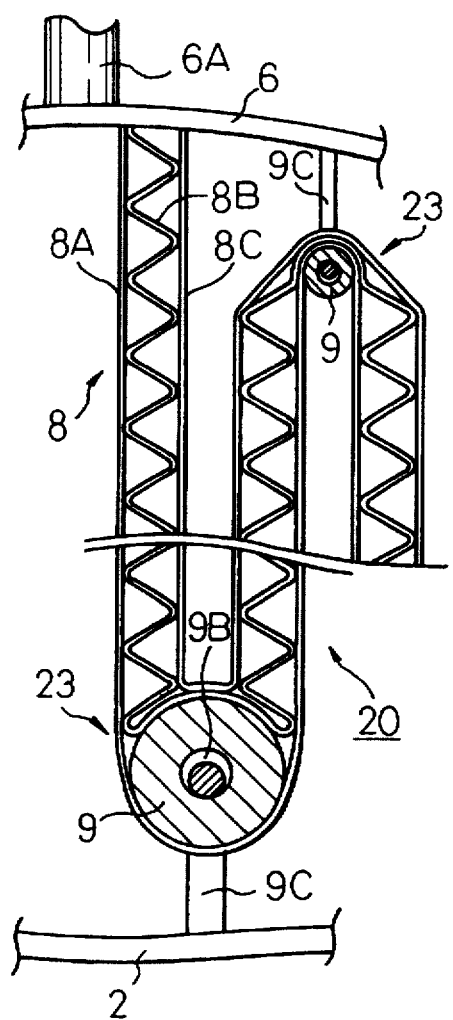
FIG. 5B is a diagram illustrating, on an enlarged scale, a second example of the folding portion of the catalyst support using the insulator in the electrically heated catalyst in which the catalyst support is formed by interposing a corrugated foil between two pieces of flat foils according to the second embodiment of the present invention.

FIGS. 5A and 5B illustrate an embodiment when the insulator 9 of a large diameter and the insulator 9 of a small diameter are used in combination at the folding portions 28 of the catalyst support 8. FIGS. 6A and 6B illustrate an embodiment where the insulator 9 of a large diameter only is used at the folding portions 23 of the catalyst support 8.

Figure 7:
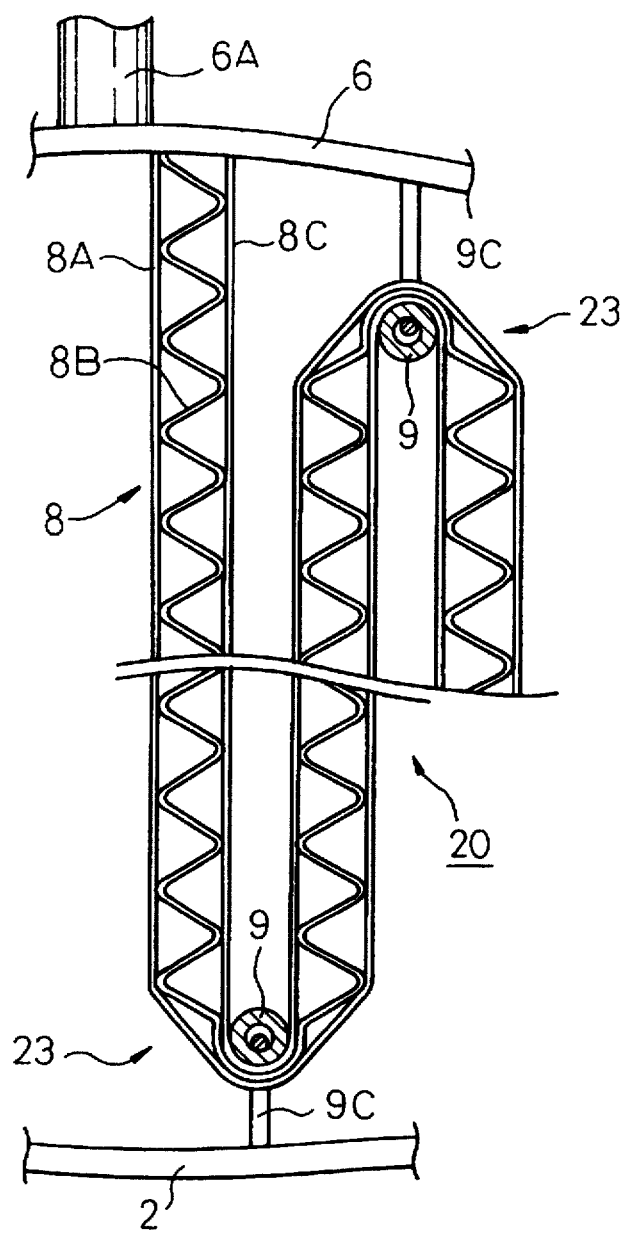
FIG. 7 is a diagram illustrating, on an enlarged scale, a fifth example of the folding portion of the catalyst support using the insulator in the electrically heated catalyst in which the catalyst support is formed by interposing a corrugated foil between two pieces of flat foils according to the second embodiment of the present invention.

FIG. 7 illustrates an embodiment where the insulator 9 of a small diameter only is used at the folding portions 23 of the catalyst support 8.

Here, when the insulator 9 of a large diameter is inserted in the space formed by peeling the corrugated foil 8B from the flat foil 8A at the folding portion 23 as shown in FIG. 5B, it is the flat foil 8A only that receives the tension from the insulator 9. In this case, therefore, only a small tension is exerted. In such a case, therefore, the insulator 9 of a large diameter should be inserted in space that is formed by crushing the corrugated foil 8B and overlapping it on the flat foil 8 at the folding portion 23 as shown in FIG. 8A. In this case, the tension is applied from the insulator 9 to both the flat foil 8A and the corrugated foil 8B, and a large tension is exerted.

Figure 8:
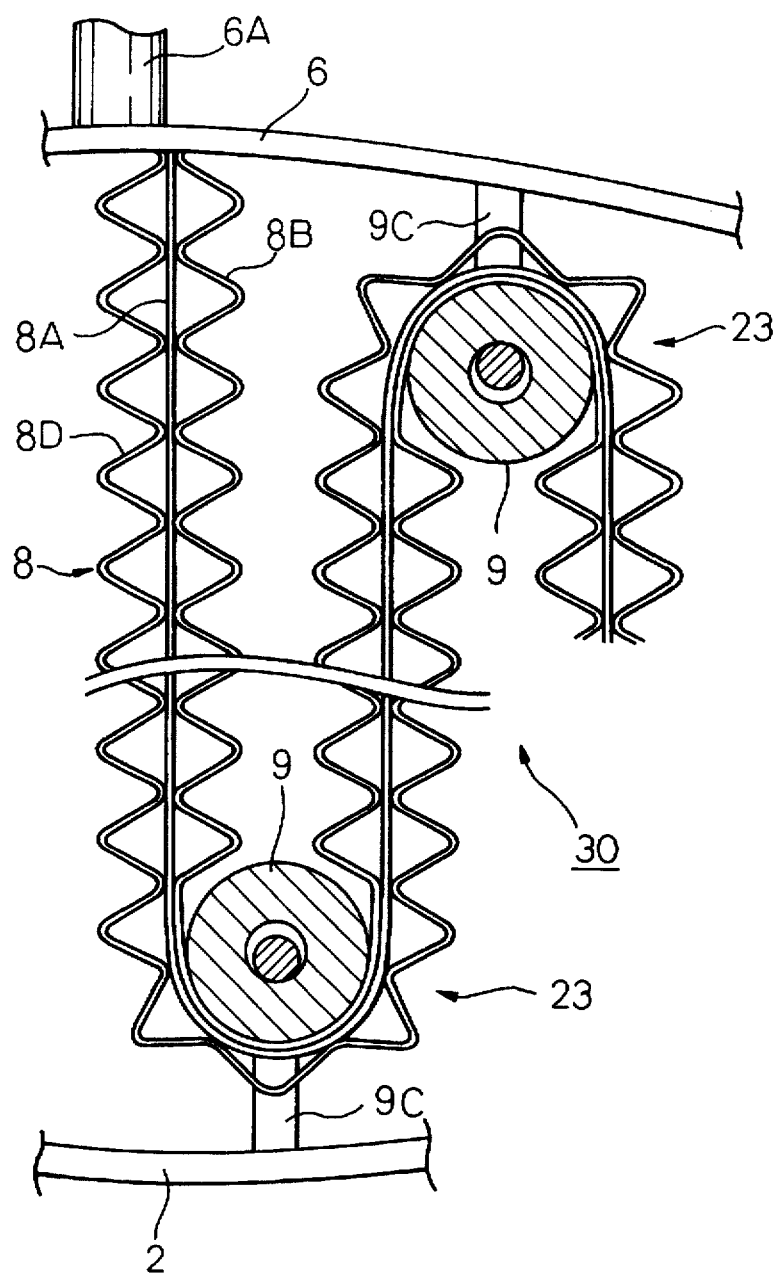
FIG. 8 is a diagram illustrating, on an enlarged scale, an example of the folding portion of the catalyst support using the insulator in the electrically heated catalyst in which the catalyst support is formed by interposing a corrugated foil between two pieces of flat foils according to a third embodiment of the present invention.

FIG. 8 illustrates the structure of an electrically heated catalyst 30 according to a third embodiment of the present invention in which the flat foil 8A is interposed between two pieces of corrugated foils 8B and 8D to form the catalyst support 8 of the electrically heated catalyst 10, and shows the same portions as those of FIGS. 3A and 3B. When the catalyst support 8 is formed by interposing the flat foil 8A between the two pieces of corrugated foils 8B and 8D, there is no directivity of front surface or back surface in folding the catalyst support 8 and the corrugated foils 8B are opposed to each other or the corrugated foils 8D are opposed to each other irrespective of into which side the catalyst support 8 is folded. In this case, therefore, the insulator 9 of a large diameter is used at all of the folding portions 23. At the folding portions 23, the corrugated foil 8B or 8D is crushed so as to be mounted on the insulator 9.

According to the constitution of the third embodiment, it is possible to increase the surface areas of the catalyst support 8. Besides, the two pieces of corrugated foil 8B, 8D and the flat foil 8A are supported by the insulators 9 to obtain a large tension and a large strength.

Figure 9A:
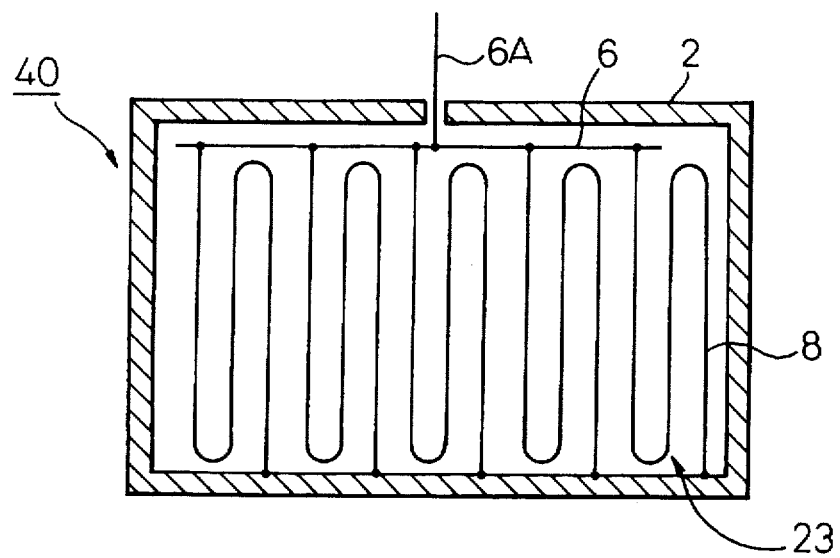
FIG. 9A is a sectional view illustrating the structure of the electrically heated catalyst in which the catalyst support is arranged in the same manner as in FIG. 1A in a direction perpendicular to the flow of the exhaust gases through the exhaust pipe according to a fourth embodiment of the present invention where the structure of the electrically heated catalyst of the present invention is adapted to the exhaust pipe of a square shape.

FIG. 9A illustrates the structure of an electrically heated catalyst 40 according to a fourth embodiment of the present invention, i.e., illustrates the structure of the electrically heated catalyst 40 of the present invention of when the exhaust pipe 2 has a square shape. Even in this embodiment, the catalyst support is formed by the combination of at least a piece of flat foil and at least a piece of corrugated foil as in the above-mentioned embodiments. FIG. 9A, however, shows the catalyst support 8 in a simplified manner, i.e., by a simple solid line. Insulators 9 at the folding portions 23 of the catalyst support 8 are not diagramed in FIG. 9A.

Figure 9B:
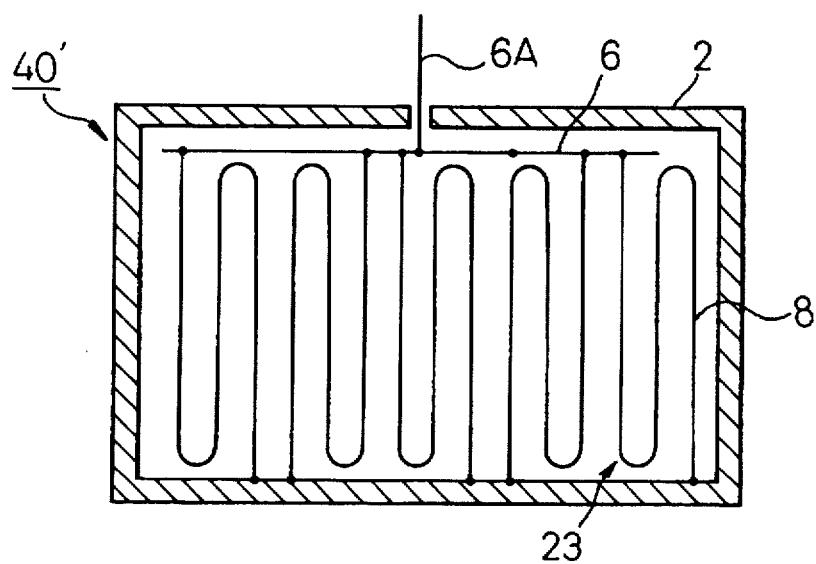
FIG. 9B is a sectional view of the electrically heated catalyst in a direction perpendicular to the flow of the exhaust gases through the exhaust pipe according to a modified example of the fourth embodiment in which the catalyst support is arranged in a manner different from that of FIG. 9A.

FIG. 9B illustrates the constitution of an electrically heated catalyst 40' according to a modified example of the fourth embodiment and in which the catalyst support 8 is arranged in a manner different from that of FIG. 9A. Even in this modified example, the catalyst support 8 is indicated by a simple solid line. Insulators 9 at the folding portions 23 of the catalyst support 8 are not diagramed in FIG. 9B. What makes the modified example of the fourth embodiment different from the fourth embodiment is that a plurality of catalyst supports 8 are arranged inside the exhaust pipe 2 in such a manner that the folding directions at the folding portions 23 are opposite between the neighboring catalyst supports 8. With the catalyst supports 8 being arranged in a manner as shown in FIG. 9B, even in case the neighboring catalyst supports 8 come into contact with each other due to vibration or the like, the contacting portions have the same potential or lower potential than the same contacting portions as shown in FIG. 9A and the catalyst supports 8 are rarely damaged.

Figure 10:
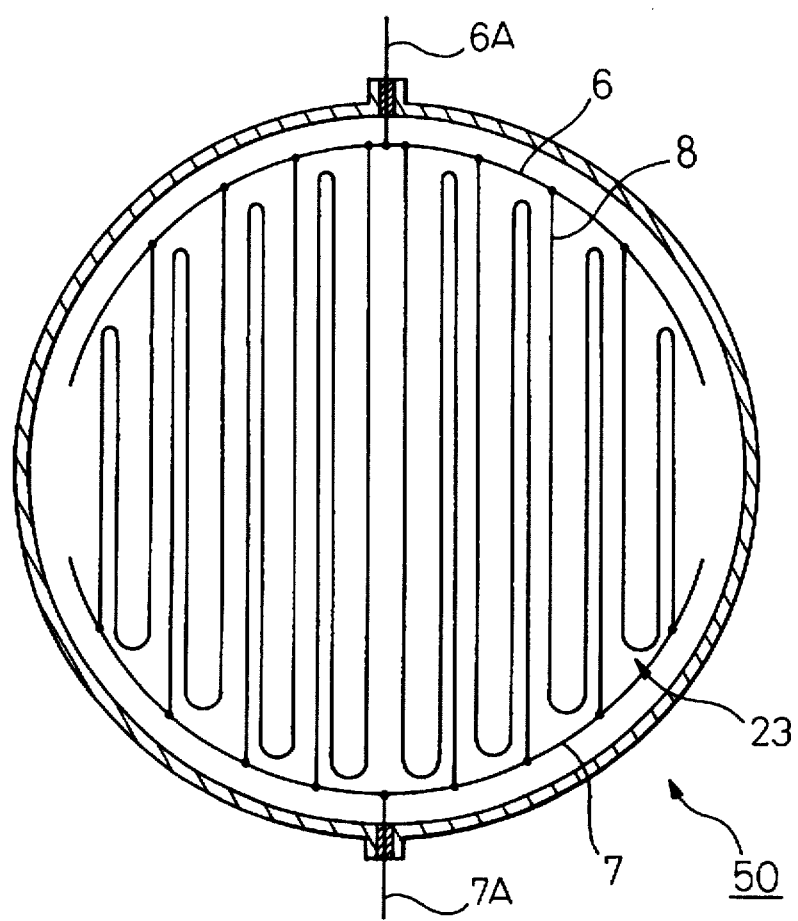
FIG. 10 illustrates the structure of the electrically heated catalyst according to a fifth embodiment of the present invention, and is a schematic sectional view in a direction perpendicular to the flow of the exhaust gases through the exhaust pipe when one electrode is provided independently of the exhaust pipe.

FIG. 10 is a diagram illustrating the structure of an electrically heated catalyst 50 according to a fifth embodiment of the present invention. In this embodiment, the constitution of the first electrode 6 is the same as that of the first embodiment. In the electrically heated catalyst 10 of the first embodiment shown in FIG. 1A, the second electrode is the outer casing 2. According to the fifth embodiment, however, a second electrode 7 having the same shape as the first electrode 6 is provided on the inside of the outer casing 2 independently of the outer casing 2, and is drawn to the outer side of the outer casing 2 through a terminal 7A making a difference from the first embodiment. Even in the fifth embodiment, the catalyst support 8 is represented by a simple solid line, and insulators 9 at the folding portions 23 of the catalyst support 8 are not diagramed.

In the first to fourth embodiments, the second electrode is the outer casing having a large heat mass, and heat is radiated to the open air resulting in the occurrence of thermal distortion. According to the fifth embodiment in which the second electrode 7 having the same shape as the first electrode 6 is provided inside the outer casing 2 independently of the outer casing 2, the second electrode 7 insulates the heat, whereby heat is less radiated to the open air and little thermal distortion occurs. Moreover, when the second electrode 7 having the same shape as the first electrode 6 is provided inside the outer casing 2 independently of the outer casing 2 as in this fifth embodiment, a plurality of electrically heated catalysts 50 can be electrically connected in series when they are installed in a plural number in the exhaust pipe 2.

Figure 11A:
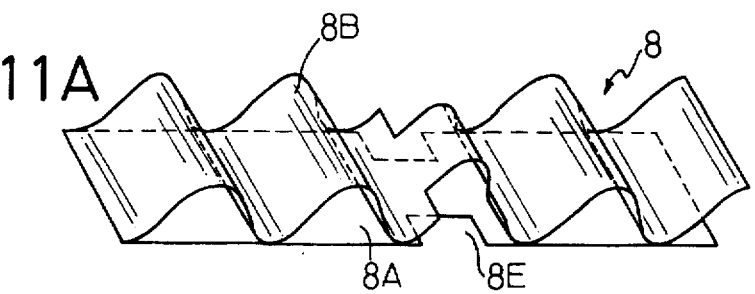
FIG. 11A illustrates the structure of the electrically heated catalyst according to a sixth embodiment of the present invention, and is a perspective view showing, on an enlarged scale, part of the catalyst support to explain the structure of a portion for generating large amounts of heat by cutting part of the catalyst support formed by the flat foil and the corrugated foil.
Figure 11B:
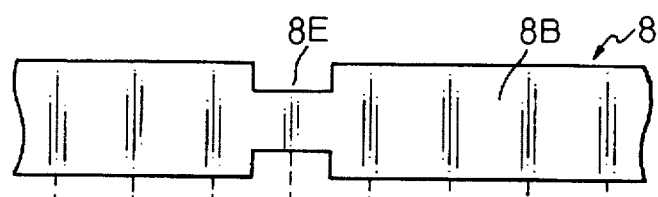
FIG. 11B is a plan view of FIG. 11A.
Figure 11C:
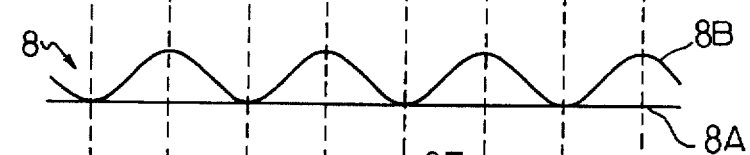
FIG. 11C is a side view of FIG. 11A.

FIGS. 11A to 11E illustrate the structure of an electrically heated catalyst according to a sixth embodiment of the present invention. In the sixth embodiment as shown in FIG. 11A, the catalyst support 8 has a cut-away portion 8E formed by cutting off part of the catalyst support that is constituted by the flat foil 8A and the corrugated foil 8B. FIG. 11B is a plan view of FIG. 11A, and FIG. 11C is a side view of FIG. 11A. The cut-away portion 8E is formed at a portion where the catalyst support 8 generates large amounts of heat, and the same portions of the flat foil 8A and the corrugated foil 8B are cut off. By forming a portion where heat is produced in large amounts, it is possible to raise the temperature at a particular portion of the catalyst support 8 to quickly obtain an activated catalyst over a wide area.

Figure 11D:
FIG. 11D is a plan view of a catalyst support illustrating the constitution of the cut-away portion of the catalyst support according to a modified example of the sixth embodiment.
Figure 11E:
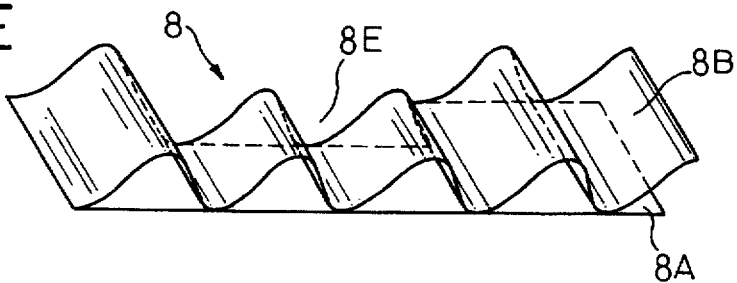
FIG. 11E is a perspective view of the catalyst support of FIG. 11D.

FIG. 11D is a is a plan view of the catalyst support 8 illustrating the constitution of a modified example of the sixth embodiment in which the length of the cut-away portion 8E of the catalyst support 8 is changed, and FIG. 11E is a perspective view of the catalyst support 8 of FIG. 11D. There is no particular limitation in the shape of the cut-away portion 8E.

Figure 12A:
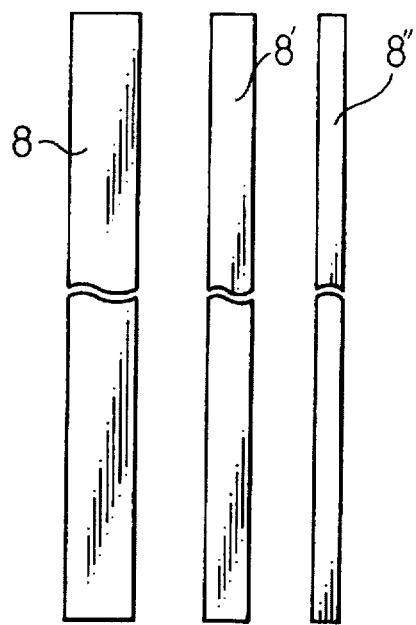
FIG. 12A illustrates the structure of the electrically heated catalyst according to a seventh embodiment of the present invention, and is an expansion view showing, in an expanded manner, catalyst supports having various widths provided in the electrically heated catalyst.
Figure 12B:
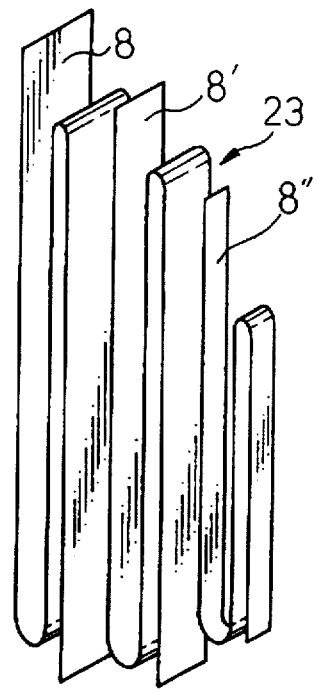
FIG. 12B is a perspective view schematically illustrating a state where, among the three kinds of catalyst supports of FIG. 12A, the one having the largest width is stretched on the central side of the exhaust pipe.

FIGS. 12A to 12E partly illustrate the structure of an electrically heated catalyst according to a seventh embodiment of the present invention. According to the seventh embodiment, the catalyst support 8 having the largest width in the direction in which the exhaust gases flow, as shown in FIG. 12A, is used as the catalyst supports 18A, 18A' of the first embodiment described with reference to FIG. 1A, the catalyst support 8' narrower than the catalyst supports 18A, 18A' in the direction in which the exhaust gases flow is used as the neighboring catalyst supports 18B, 18B', and the catalyst support 8" having the smallest width in the direction in which the exhaust gases flow is used as the catalyst supports 18C, 18C' of the outer side. FIG. 12B is a perspective view schematically illustrating the state where the three kinds of catalyst supports 8, 8' and 8" of FIG. 12A are stretched in the exhaust pipe with the broadest one at the center of the exhaust pipe.

By using the catalyst support 8 having the largest width in the central portion of the exhaust pipe 2 where the exhaust gases flow in largest amounts, the contact time is lengthened between the catalyst support 8 and the exhaust gases flowing through the exhaust pipe 2, promoting the removal of HC and CO.

It is further allowable to partly increase the width of the catalyst support 8 of only a portion where the exhaust gases flow fast through the exhaust pipe 2. In this case, the width of the belt-like metal foil of the catalyst support 8 in the direction in which the exhaust gases flow should be partly changed as in the modified example of the seventh embodiment shown in FIG. 12C. FIG. 12D is a perspective view schematically illustrating the state where the catalyst support 8 having a large width of FIG. 12C is stretched in the exhaust pipe on the center side thereof.

Figure 12C:
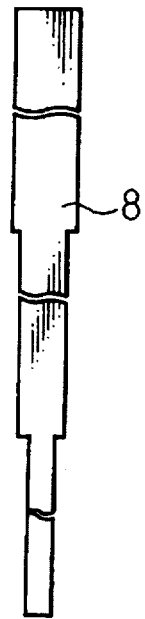
FIG. 12C shows the constitution of the catalyst support according to a modified example of the seventh embodiment and is a plan view showing, in an expanded manner, the catalyst support of which the width is partly changed.
Figure 12D:
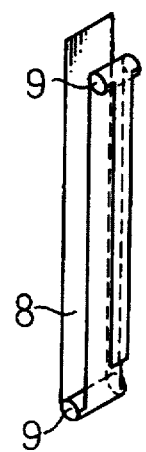
FIG. 12D is perspective view schematically illustrating the state where the catalyst support of FIG. 12C is stretched.
Figure 12E:
FIG. 12E is an expansion view illustrating a further modified example of the catalyst support.

In the modified examples shown in FIGS. 12C and 12D, though the catalyst support 8 has the same width from the portion where the catalyst support 8 is connected through up to the folding portion 23, the width of the catalyst support 8 may be partly increased as shown in FIG. 12E.

Figure 13A:
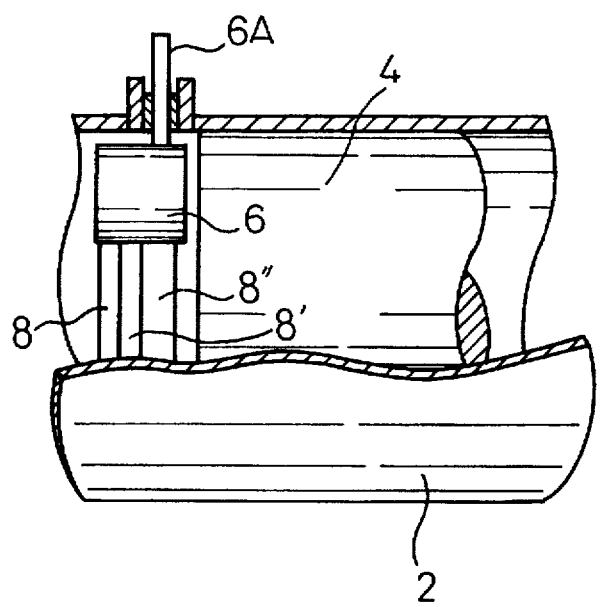
FIG. 13A is a perspective view schematically illustrating the state where, among the three kinds of catalyst supports shown in FIG. 11A, the one having the largest width is stretched on the central side of the exhaust pipe, and the edge portions on the downstream side of the exhaust gases are trued up in the exhaust pipe according to a further modified example of the seventh embodiment.
Figure 13B:
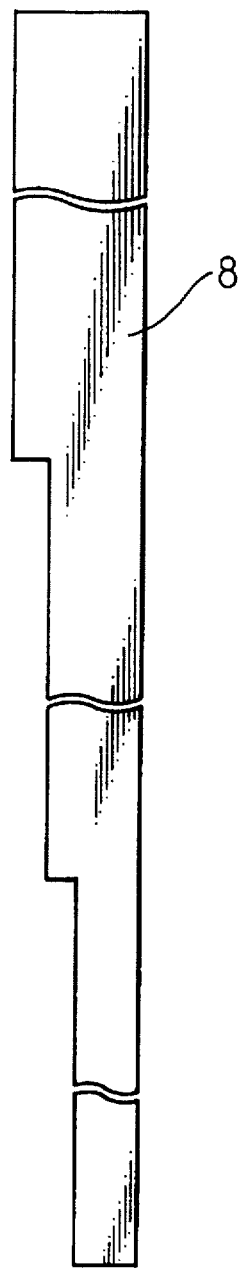
FIG. 13B is a plan view illustrating, in an expanded manner, the catalyst support of which the width is partly changed by cutting off edge portions on one side only according to a still further modified example of the seventh embodiment.

FIG. 13 illustrates a further modified example of the seventh embodiment explained with reference to FIG. 12. In this modified example, the electrically heated catalyst is constituted by using three kinds of catalyst supports 8, 8' and 8" shown in FIG. 12A. Here, however, the ends of the catalyst supports 8, 8' and 8" are trued up on the downstream side of the flow of exhaust gases (on the side of the regular catalytic converter 4). With the ends of the catalyst supports 8 being trued up in the exhaust pipe 2 on the side of the regular catalytic converter 4 as described above, it is possible to decrease the distance between the catalyst support 8 and the front end of the regular catalytic converter 4 and, hence, to quickly transmit the heat of reaction in the electrically heated catalyst to the regular catalytic converter 4. In partly changing the width of the catalyst support 8 in the direction in which the exhaust gases flow, the edge of the catalyst support 8 may be cut off on one side only as shown in FIG. 13B.

Figure 14:
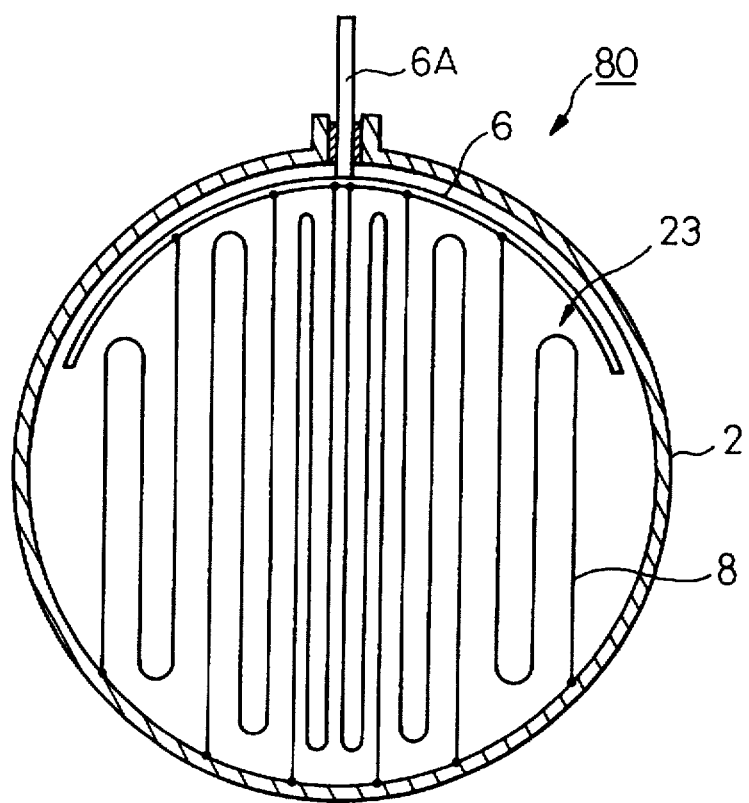
FIG. 14 illustrates the structure of the electrically heated catalyst according to an eighth embodiment of the present invention, and is a sectional view of the electrically heated catalyst in a direction perpendicular to the flow of the exhaust gases through the exhaust pipe and in which the gap of the catalyst support is narrowed in the central portion of the exhaust pipe and is broadened toward the right and left sides.

FIG. 14 illustrates the structure of an electrically heated catalyst 80 according to an eighth embodiment of the present invention. In this embodiment, the catalyst supports 8 all have the same width in the direction in which the exhaust gases flow. Here, however, the gap among the catalyst supports 8 is narrow in the central portion of the exhaust pipe and is broadened toward the right and left sides. Even this arrangement makes it possible to promote the removal of HC and CO at the central portion of the exhaust pipe 2 where the exhaust gas flows in the largest amount.

Figure 15A:
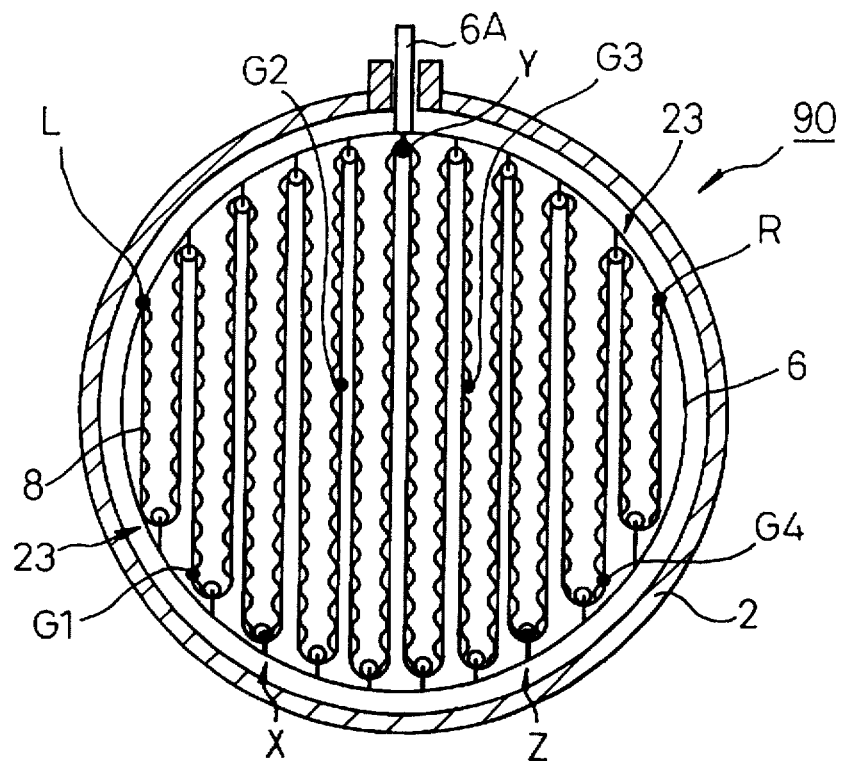
FIG. 15A illustrates the structure of the electrically heated catalyst according to a ninth embodiment of the present invention, and is a sectional view of the electrically heated catalyst in a direction perpendicular to the flow of the exhaust gases through the exhaust pipe of an internal combustion engine.
Figure 15B:
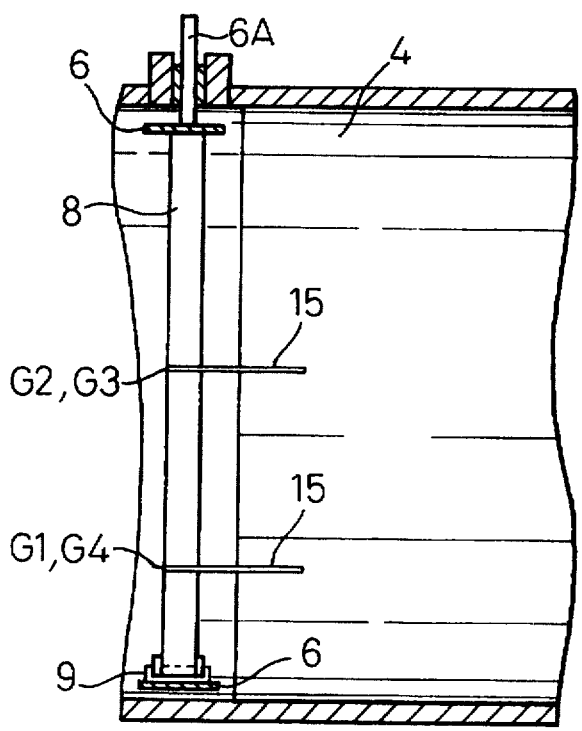
FIG. 15B is a sectional view in a direction in parallel with the flow of the exhaust gases through the exhaust pipe to illustrate a state in which the electrically heated catalyst of FIG. 15A is disposed in the exhaust pipe.
Figure 15C:
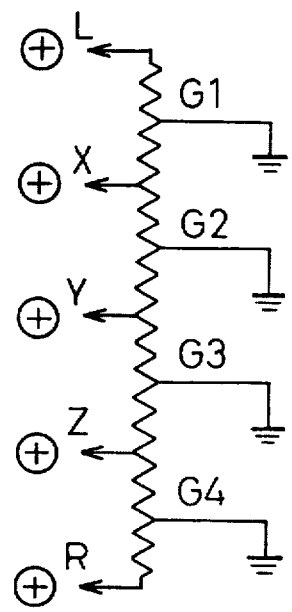
FIG. 15C is a circuit diagram illustrating the electric structure of FIG. 15A.

FIGS. 15A to 15C illustrate the structure of an electrically heated catalyst 90 according to a ninth embodiment of the present invention. In the ninth embodiment as shown in FIG. 15A, a first annular electrode 6 is provided on the inside of the exhaust pipe 2 concentric with the exhaust pipe 2. On the inside of the first annular electrode 6, a long catalyst support that is not divided is stretched after being folded by the insulators 9 in a zig-zag manner.

That is, in the ninth embodiment, an end of the single catalyst support 8 is connected to the first electrode 6 at a point L on the left side in the exhaust pipe 2. The catalyst support 8 is folded by a plurality of insulators 9 secured to the first electrode 6, and is connected to the first electrode 6 at a point R on the right side in the exhaust pipe 2. Except for the insulators 9 at points X, Y and Z in the drawing, the insulators 9 at all of the folding points 23 are made of an insulating material to prevent the catalyst support 8 from coming into contact with the first electrode 6. On the other hand, the insulators 9 at the points X, Y and Z are made of an electrically conducting material and connect the catalyst support 8 to the first electrode 6.

In the ninth embodiment, furthermore, the catalyst support 8 is connected at a point G1 between points L and X, at a point G2 between points X and Y, at a point G3 between points Y and Z, and at a point G4 between points Z and R, to the catalytic converter 4 on the downstream side of the flow of the exhaust gases through grounding rods 15 shown in FIG. 15B. In this embodiment, the catalytic converter 4 has an electrically conducting property and is grounded through the exhaust pipe 2. FIG. 15C is a diagram of an electrically equivalent circuit of the constitution of FIGS. 15A and 15B.

In the ninth embodiment, there is no limitation on the number of the electrically conducting insulators 9. Here, when the number of the electrically conducting insulators 9 is m, the number of the grounding rods 15 is m−1. By changing the number of the electrically conducting insulators 9 and the positions at which the grounding rods 15 are installed, it becomes possible to change the thermal balance of the catalyst support 8.

Figure 16A:
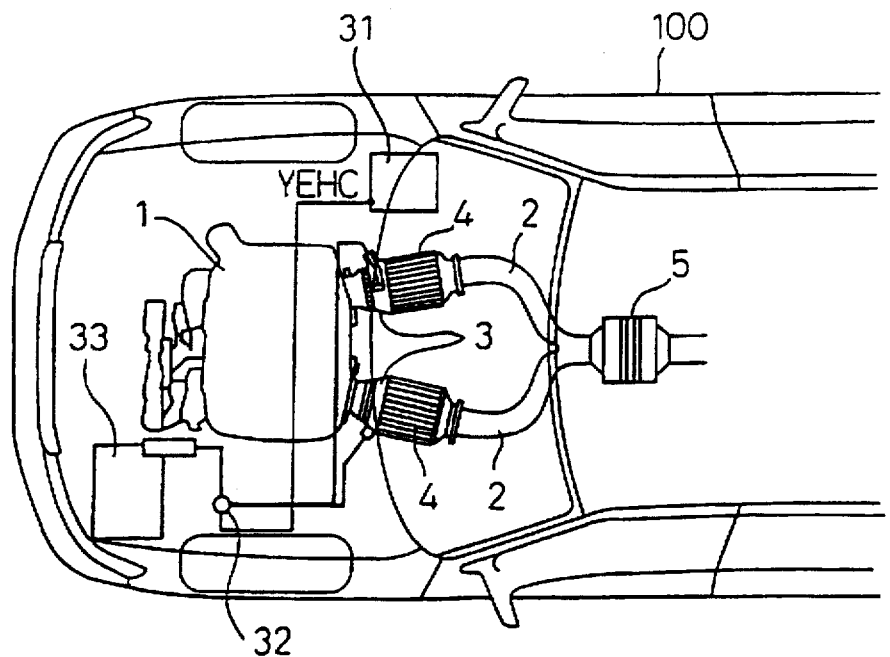
FIG. 16A is a perspective plan view of an automobile mounting the electrically heated catalyst of the present invention in the exhaust pipe of a V-type internal combustion engine.
Figure 16B:
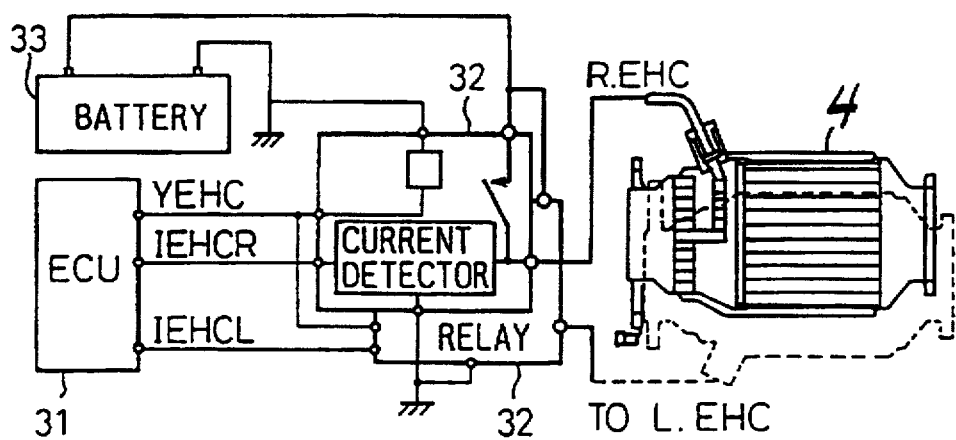
FIG. 16B is a circuit diagram illustrating the constitution of a circuit for passing current to the electrically heated catalyst of the present invention.

FIG. 16A is a perspective plan view of an automobile having the electrically heated catalyst of the present invention in the exhaust pipe of a V-type internal combustion engine, and FIG. 16B is a circuit diagram illustrating the constitution of a circuit for passing current to the electrically heated catalyst of FIG. 16A. In the V-type internal combustion engine 1, the exhaust gases are emitted through the exhaust pipes 2 of two systems. In this embodiment, therefore, the electrically heated catalyst 3 is provided in each of the exhaust pipes 2. There is the regular catalytic converter 4 on the downstream side of the electrically heated catalyst 3, and another catalytic converter 5 is provided on the downstream side of a portion where the exhaust pipes 2 meet together.

Furthermore, the electric current is supplied to the electrically heated catalyst 3 from a battery 33 mounted on a vehicle 100 through a relay 32 shown in FIG. 16A, and the relay 32 is opened and closed by an ECU (engine control unit) 31. The ECU 31, relay 32, battery 33 and electrically heated catalyst 3 are connected as shown in FIG. 16B. In this embodiment, the two electrically heated catalysts 3 are connected to the two relays 32, respectively.

The ECU 31 turns the relay 32 on under, for example, the following conditions:

(1) The rotational speed of the engine is not smaller than 400 rpm.

(2) The temperature of water at the time of starting the engine is within a range of 5° to 35° C.

(3) Within a period of 10 seconds after the start of the engine.

(4) The air pump for introducing the secondary air is normally working.

(5) The battery voltage is not lower than 9.5V.

(6) The electrically heated catalyst is normal.

When two electrically heated catalysts 3 are mounted as in the V-type internal combustion engine 1, the terminals for feeding the current to the two electrically heated catalysts 3 may often be connected in series in addition to connecting the two electrically heated catalysts 3 in parallel of the embodiment of FIGS. 16A and 16B. When the electrically heated catalysts 3 are electrically connected in series, there can be employed the thermally excellent structure of the electrically heated catalyst of the fifth embodiment described with reference to FIG. 10.

According to the present invention as explained above by way of various embodiments, it is possible to provide the structure of an electrically heated catalyst which is simply constructed and consumes small amounts of electric power without increasing the flow resistance to the exhaust gases.

What is claimed is:

1. An electrically heated catalyst which is located on an upstream side of a catalytic converter that is provided in an exhaust pipe of an internal combustion engine to remove harmful components contained in exhaust gases and which, when the catalytic converter is so cool that it is inactive, is electrically heated to assist the purifying action of the catalytic converter, the electrically heated catalyst comprising:

an outer casing for passing the exhaust gases;

first and second electrodes provided inside the outer casing, the first electrode having a first polarity and the second electrode having a second polarity different from the first polarity;

at least one catalyst support received within the outer casing, the catalyst support being formed of metal foils which are folded at least twice in a zig-zag manner in a direction to intersect a direction of flow of the exhaust gases wherein adjacent portions of the catalyst support are separated from one another to form an exhaust gas channel between each pair of adjacent portions of the catalyst support, wherein a first end of the catalyst support is connected to the first electrode and a second end of the catalyst support is connected to the second electrode; and a plurality of folding axis members, each folding axis member being provided at a folding portion of the catalyst support for stretching and supporting the catalyst support inside the outer casing wherein the first electrode is disposed adjacent to an odd numbered folding portion as counted from the second electrode, and wherein the second electrode is disposed adjacent to an even numbered folding portion, and the folding axis members support the catalyst support while maintaining electric insulation between the first and second electrodes.

2. An electrically heated catalyst according to claim 1, wherein the metal foils of the catalyst support comprise a flat foil and a corrugated foil joined together, and wherein contact portions of both the flat foil and the corrugated foil are supported by the folding axis members.

3. An electrically heated catalyst according to claim 1, wherein the metal foils of the catalyst support comprise a flat foil and a corrugated foil joined together, and wherein the folding axis members are inserted in space formed between the flat foil and the corrugated foil to support the flat foil.

4. An electrically heated catalyst according to claim 1, wherein the catalyst support is constituted by joining two pieces of flat foils together with a piece of corrugated foil interposed therebetween, and the folding axis members are inserted in spaces formed between the corrugated foil and the one of the two pieces of flat foil located on an inner side of the corrugated foil furthest from the outer casing at each respective folding portion in order to support each of a plurality of contact portions of the corrugated foil and the flat foil.

5. An electrically heated catalyst according to claim 1, wherein the catalyst support is constituted by joining two pieces of flat foils together with a piece of corrugated foil interposed therebetween, and the folding axis members are inserted in spaces formed between the corrugated foil and the one of the two pieces of flat foil located on an outer side nearest to the outer casing at each respective folding portion in order to support each of a plurality of contact portions of the corrugated foil and the flat foil.

6. An electrically heated catalyst according to claim 1, wherein the catalyst support is constituted by joining two pieces of flat foils together with a piece of corrugated foil interposed therebetween, and wherein the folding portion supports a junction portion of the two pieces of flat foils and the corrugated foil, wherein at the junction portion at least one of the two flat foils contacts the corrugated foil.

7. An electrically heated catalyst according to claim 1, wherein the catalyst support is constituted by joining two pieces of corrugated foils together with a piece of flat foil interposed therebetween, and wherein the folding portion supports a junction portion of the two corrugated foils and the flat foil.

8. An electrically heated catalyst according to claim 1, wherein the at least one catalyst support comprises a plurality of catalyst supports, each catalyst support being folded at least twice, and being connected at a first end thereof to the first electrode and being connected at a second end thereof to the second electrode.

9. An electrically heated catalyst according to claim 8, wherein the plurality of catalyst supports are disposed inside the outer casing side-by-side so that the folding portions of each catalyst support are folded so that where one catalyst support has a first fold adjacent to the first electrode, a portion of the catalyst support adjacent to the first fold will have a fold adjacent to the second electrode.

10. An electrically heated catalyst according to claim 8, wherein a size of a gap between adjacent catalyst supports decreases toward a central portion of the outer casing.

11. An electrically heated catalyst according to claim 8, wherein the folding axis members are arranged so that a direction in which the catalyst supports are stretched is in agreement with a direction of principal vibration to which the catalyst supports are subjected during use.

12. An electrically heated catalyst according to claim 8, wherein each of the catalyst supports has a width in a direction along a direction of flow of the exhaust gases that varies depending upon the position at which the catalyst support is stretched.

13. An electrically heated catalyst according to claim 8, wherein each of the catalyst supports has a width in a direction along a direction of flow of the exhaust gases that varies depending upon the position at which the catalyst support is stretched, wherein exhaust gas flows through the catalyst supports from upstream sides to downstream sides thereof, and wherein the downstream sides of the catalyst supports have and positions that are trued up.

14. An electrically heated catalyst according to claim 1, wherein each folding axis member has flanges at both ends thereof to maintain the folding portions of each catalyst support in contact with a respective folding axis member.

15. An electrically heated catalyst according to claim 1, wherein a portion of the outer casing in which the catalyst support is held is outwardly swollen, and wherein the first and second electrodes are held in the swollen portion.

16. An electrically heated catalyst according to claim 3, wherein portions of the flat foil and the corrugated foil that are facing each other are cut away to generate locally an increased amount of heat.

17. An electrically heated catalyst which is located on an upstream side of a catalytic converter that is provided in an exhaust pipe of an internal combustion engine to remove harmful components contained in exhaust gases and which, when the catalytic converter is so cool that it is inactive, is electrically heated to assist the purifying action of the catalytic converter, the electrically heated catalyst comprising:

an outer casing for passing the exhaust gases;

a first electrode provided inside the outer casing;

at least one catalyst support received within the outer casing, the catalyst support being formed of metal foils which are folded at least twice in a zig-zag manner in a direction to intersect a direction of flow of the exhaust gases wherein adjacent portions of the catalyst support are separated from one another so that an exhaust gas channel is formed between each pair of adjacent portions of the catalyst support, wherein a first end of the catalyst support is connected to the first electrode;

a plurality of first folding axis members, each first folding axis member being provided at a respective first folding portion of the catalyst support to stretch and support the catalyst support inside the outer casing;

a plurality of second folding axis members, wherein each second folding axis member in formed of an electrically conducting material and wherein each second folding axis member is provided at a respective second folding portion distributed so that at least one first folding portion is located between adjacent pairs of second folding axis members to stretch and support the catalyst support inside the outer casing and to connect the catalyst support to the first electrode; and a plurality of electrically conducting members that are electrically connected to the catalyst support at intermediate positions between one end of said catalyst support and a respective second folding axis member and at intermediate positions between adjacent second folding axis members in order to connect the intermediate positions of the catalyst support to a second electrode having a potential different from the first electrode.

* * * * *

UNITED STATES PATENT AND TRADEMARK OFFICE
CERTIFICATE OF CORRECTION

PATENT NO. : 5,800,789

DATED : September 1, 1998

INVENTOR(S) : Kouji YOSHISAKI

It is certified that error appears in the above-indentified patent and that said Letters Patent is hereby corrected as shown below:

| Column | Line | |
|--------|------|---|
| 10 | 12 | Change "FIG. 8A" to --FIG. 5A--. |
| 14 | 17 | Change "caning" to --casing--. |
| 15 | 53 | Change "and" to --end--. |

Signed and Sealed this

Second Day of November, 1999

Attest:

Attesting Officer

Q. TODD DICKINSON

Acting Commissioner of Patents and Trademarks